(12) United States Patent
Dechape

(10) Patent No.: US 7,694,549 B2
(45) Date of Patent: Apr. 13, 2010

(54) PNEUMATIC GAUGING SYSTEM A.K.A. AIR GAUGING SYSTEM A.K.A. AIR ELECTRIC CONVERTER

(76) Inventor: Michel Dechape, 6191 Grand Cypress Cir., Lake Worth, FL (US) 33463

(*) Notice: Subject to any disclaimer, the term of this patent is extended or adjusted under 35 U.S.C. 154(b) by 133 days.

(21) Appl. No.: 11/877,181

(22) Filed: Oct. 23, 2007

(65) Prior Publication Data

US 2009/0100908 A1    Apr. 23, 2009

(51) Int. Cl.
*G01B 13/08*    (2006.01)
(52) U.S. Cl. .................................................. 73/37.5
(58) Field of Classification Search ................ 73/37.5, 73/597; 367/125
See application file for complete search history.

(56) References Cited

U.S. PATENT DOCUMENTS

| | | | | |
|---|---|---|---|---|
| 2,986,924 | A * | 6/1961 | Becker | 73/37.5 |
| 4,550,592 | A * | 11/1985 | Dechape | 73/37.5 |
| 4,752,917 | A * | 6/1988 | Dechape | 367/125 |
| 4,953,388 | A * | 9/1990 | Barada | 73/37.5 |
| 5,317,898 | A * | 6/1994 | Nemeth | 73/37.7 |
| 5,347,847 | A * | 9/1994 | Ogden et al. | 73/37 |
| 6,978,658 | B1 * | 12/2005 | Kochersperger | 73/37.5 |
| 7,010,958 | B2 * | 3/2006 | Gajdeczko et al. | 73/37.5 |
| 7,017,390 | B1 * | 3/2006 | Vogel | 73/37.5 |
| 7,021,119 | B2 * | 4/2006 | Violette | 73/37.5 |
| 7,021,120 | B2 * | 4/2006 | Carter et al. | 73/37.5 |
| 7,021,121 | B2 * | 4/2006 | Ebert et al. | 73/37.5 |
| 7,124,624 | B2 * | 10/2006 | Gajdeczko et al. | 73/37.5 |
| 7,134,321 | B2 * | 11/2006 | Galburt et al. | 73/37.5 |
| 7,140,233 | B2 * | 11/2006 | Vogel | 73/37.5 |
| 7,472,579 | B2 * | 1/2009 | Violette | 73/37.5 |
| 7,472,580 | B2 * | 1/2009 | Lyons et al. | 73/37.5 |
| 7,500,380 | B2 * | 3/2009 | Carter et al. | 73/37.5 |
| 7,549,321 | B2 * | 6/2009 | Kochersperger et al. | 73/37.5 |
| 2009/0100908 | A1 * | 4/2009 | Dechape | 73/37.5 |

* cited by examiner

*Primary Examiner*—John Fitzgerald

(57) ABSTRACT

A single block pneumatic gauging system, with an appropriate passageway, receives compressed air to its inlet and its outlet is connected to an air probe. Parts to be gauged, are placed on a fixture which incorporates the air probe. The proximity of the part, to the nozzle of the air probe, creates a restriction which causes the air speed in the passageway to vary proportionally to the size of the part. A transmitter, at the mid-point of the passageway, generates a sonic wave, which propagates in the passageway. A receiver at the inlet will sense the sonic wave which travels at the speed of sound minus the air speed and a receiver at the outlet will sense the sonic wave which travels at the speed of sound plus the air speed. Phase comparison of both waves provides a signal proportional to air speed in the passageway which in turn is proportional to the size of the part being gauged.

10 Claims, 2 Drawing Sheets

PNEUMATIC GAUGING SYSTEM A.K.A. AIR GAUGING SYSTEM A.K.A. AIR ELECTRIC CONVERTER

BACKGROUND OF THE INVENTION

Pneumatic or Air Gauging is in use in all branches of Manufacturing to perform Quality Control, of machined parts, to precise dimensional tolerances.

As its name implies, this type of gauging uses the shop air available in all manufacturing plants (50-100 PSI) thru an Air Electric Converter such as this invention, to which an air probe or gauging fixture is connected at its outlet.

The part to be checked for proper tolerances is placed on a fixture which incorporates the nozzle(s) from which the compressed air exits the Air Electric Converter or, in some cases, the air tooling which includes the nozzles is manually inserted in the part to measure its inside diameter.

The distance between the face of the nozzle(s) and the surface of the part being checked, determines the amount of air exiting the Air Electric Converter.

Using 1 or 2 "MASTER" parts of precisely known dimension and placing them alternately on the fixture, the entire gauging system can be calibrated to those values.

At this point, each manufactured part will be compared to the mean value and their deviation from the nominal value logged by the processing equipment or in some automatic gauging systems parts can be sorted by categories including rejects.

Although the principal use of this invention is for dimensional gauging of machined parts, it is suitable for checking or classifying precision orifices and measuring very small diameter thru holes.

In today's world, the possibilities for interfacing with other instruments and computers are numerous and ever changing. Those stated are only representative of what is available today.

The invention could be assembled without the phase locked loop or the analog digital converter.

This invention can incorporate an air filter at the inlet and a shut-off valve to manually or automatically close the air to conserve energy.

The present invention has for principal object to provide a single-piece pneumatic circuit module, thus avoiding the complex plumbing of pneumatic circuit units, available on the market, that generally consist of fixed and adjustable orifices, bourdon tubes, bellows, diaphragms, levers and pivots which introduce parasitical friction and hysteresis, which result in inaccurate measurement of work pieces.

Even the most advanced differential units using direct electrical signal from a solid state sensor relying on back pressure measurements have a very small linear range of operation and require complex tooling. Reference to U.S. Pat. No. 4,550,592.

DETAILED DESCRIPTION OF THE PREFERRED EMBODIMENTS

The present invention has the following objects:

A—Provide a linear output for a range of 0.01" (254 microns) or more.

B—Compatibility with any type of tooling, any measurement, any range, any tolerance.

C—No pressure drop across the measuring circuit.

D—No bleed or balancing orifices to waste compressed air.

E—No fix or adjustable orifices which can get clogged or tampered with, causing erroneous readings.

F—Simplified tooling design (no need for undercut of the nozzles).

G—Considerable savings in compressed air usage by using lower or no undercut of the nozzles, no need for bleeding and more importantly, the air supply can be turned off, between measurements, because the measuring circuit will be ready to operate, without re-calibration, a split second after the air is turned back on.

H—Provide output signals compatible with all instruments and systems in use today.

J—Provide new digital formats for advanced computerized system.

K—Provide wireless digital outputs on Infra Red and/or Radio Frequency links.

In this invention, FIG. 1, the compressed air (10 to 50 PSI) enters the pneumatic circuit module 1 at its inlet 16 and exits at its outlet 17 to which an air probe 7 is connected. The distance d from the part being gauged to the face of 7, affects the amount of air passing thru the pneumatic circuit module 1 and therefore the air speed in passageways 2 and 3. If d is zero, the air speed will be zero. However as d increases, the air speed increases proportionately.

The transmitter 4, located at the mid-point of the passageway, emits a sound wave, which travels in the compressed air, simultaneously upstream to the reference receiver 5 at the entrance of the passageway and downstream to the measurement receiver 6 at the exit of the passageway.

The signal from the reference receiver 5 is connected to the inputs of phase comparator 12 and 13. Comparator 13 in conjunction with Voltage Controlled Oscillator 10 adjust the frequency of the excitation for the transmitter 4, to maintain an integral number of wavelengths in the reference side, despite changes in the speed of sound caused by temperature, pressure or humidity variations.

As the sound wave travels a the speed of sound minus the air speed in the reference side 2 and at the speed of sound plus the air speed in the measurement side 3, the wave at the measurement receiver 6 will lead the wave at the reference receiver 5 and phase comparator 13 will output a signal which is proportional to the phase shift between the two receivers 5 and 6, which is proportional to the air speed in the passageway of the pneumatic circuit module 1, which is proportional to d.

Outside of some proprietary circuits, items 10, 11, 12, 13, 14 and 15 are made of integrated circuits readily available from several manufacturers.

In another embodiment of this invention, FIG. 3, the compressed air enters the pneumatic circuit module at its inlet 20 located at the mid-point of the passageway and exits at both outlets 16 and 17 to which a fixture similar to 21, having two separate air circuits, is connected.

In this case, the bushing 9 which is being checked for double squareness, on fixture 21, restricts the air exiting from nozzles 7a 7d which are connected to outlet 17 and nozzles 7b 7c which are connected to outlet 16 of the pneumatic circuit module 1.

If the bore in the bushing 9 is perfectly square to its bottom face, the restriction on the air exiting the four nozzles will be the same, therefore the air speed in the passageways 2 and 3 will be equal, resulting in a zero output from 13.

If the bore is not square with the face of the bushing and the bushing is rotated on fixture 21 one full revolution, the restriction to the air exiting 7a 7d will be maximal at some point while the restriction of the air exiting 7d 7c will be minimal, with the opposite happening one half turn passed that point.

The output from 13 will go from a maximum positive to a maximum negative, for each revolution of part 9 on the fixture 21, providing information on the total squareness deviation.

SUMMARY OF THE INVENTION

A pneumatic circuit 1, for pneumatic gauging, having an inlet 16 connected to a source of compressed air and an outlet 17 connected to an air probe 7. The air speed in the pneumatic circuit 1 will vary linearly, with the restriction imposed to the nozzle of the air probe 7 and its distance d to the surface being measured (gauged). The passageway between the inlet and outlet is divided in two equal parts, a reference side 2 and a measurement side 3. At the junction of the two parts, a sonic or ultrasonic wave transmitter 4 generates a continuous wave in both parts of the passageway. A sonic or ultra sonic receiver 5 is placed at the inlet (reference side) of the passageway and another receiver 6 at the outlet (measurement side). The signal received on the reference side is sent to a Phase-Locked Loop or similar circuits 12,10,11 to adjust the frequency of the wave in order to maintain an integral number of wavelength between the sonic or ultrasonic transmitter 4 and the reference receiver 5, regardless of variations in the speed of sound or the air speed in the passageway. The signal from the measurement receiver 6, is then phase compared with the reference receiver 5, by 13 to provide an output proportional to the phase shift, which is proportional to the distance d between the nozzle of the air probe 7 and the surface being checked 9.

In another embodiment, the source of compressed air is connected to inlet 20 at the same location of the passageway than 4 and exits at both outlets 16 and 17. This configuration is very useful to perform complex differential measurements.

Figure 1:
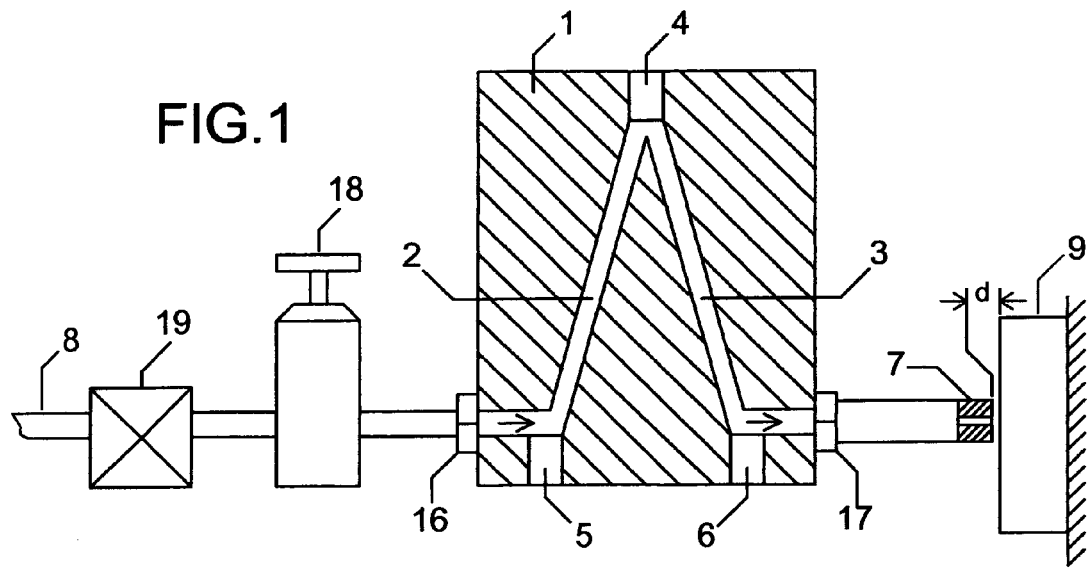
FIG. 1 Is a schematic representation of a pneumatic circuit module, according to the present invention, for use in pneumatic gauging.
Figure 2:
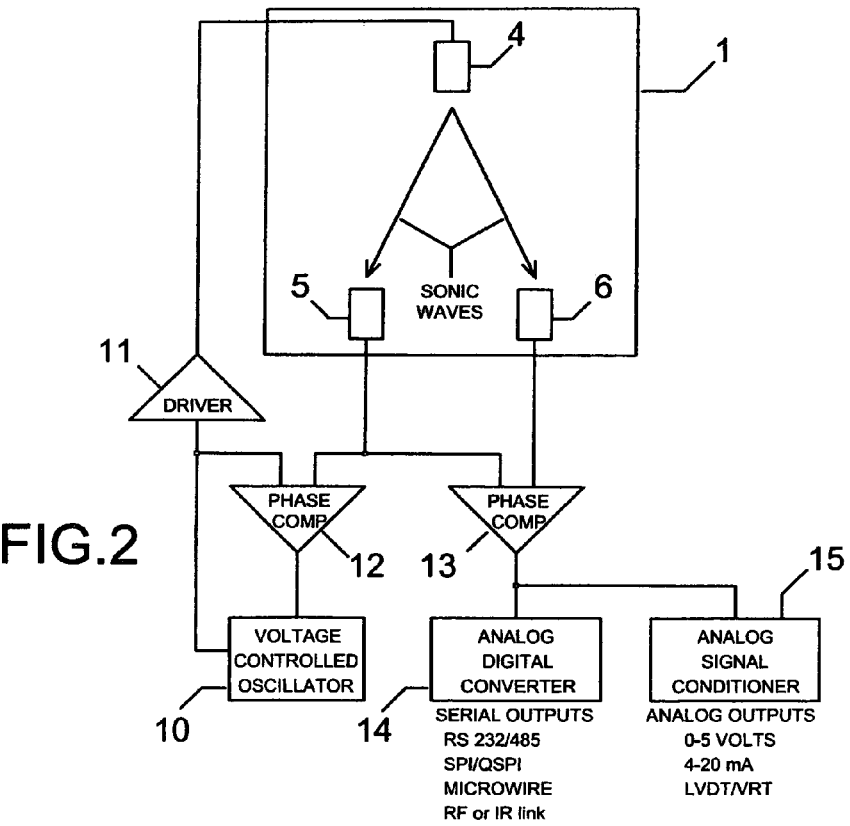
FIG. 2 Is a simplified equivalent electrical schematic, useful in explaining the operation of the electrical portion of the invention.
Figure 3:
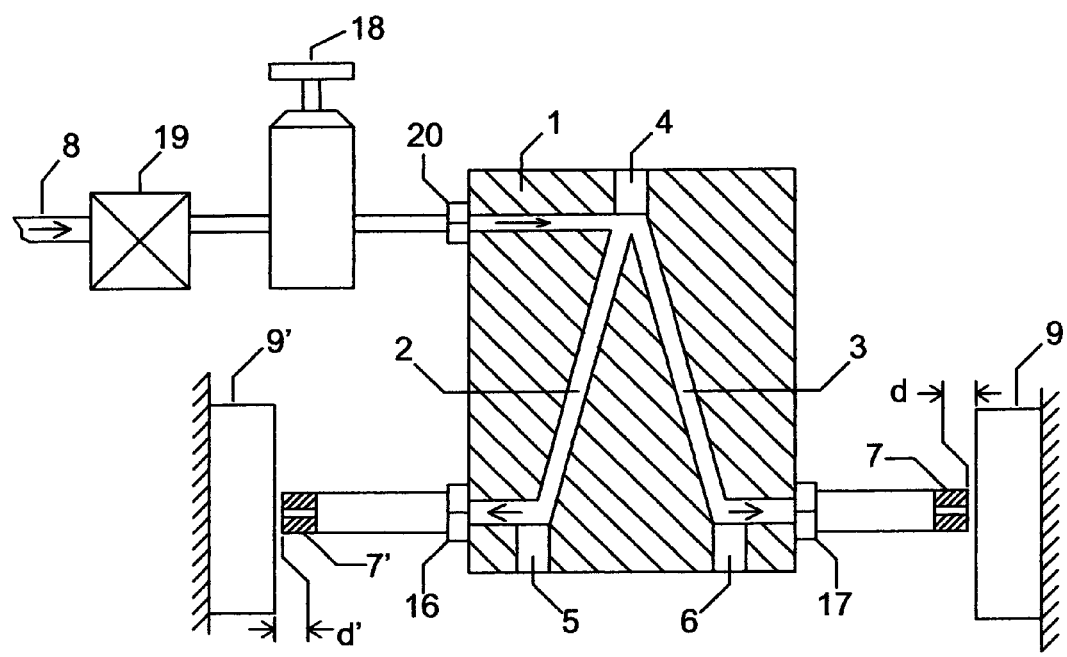
FIG. 3 Is a variation of FIG. 1 showing an alternate configuration with two outlets for differential gauging.
Figure 4:
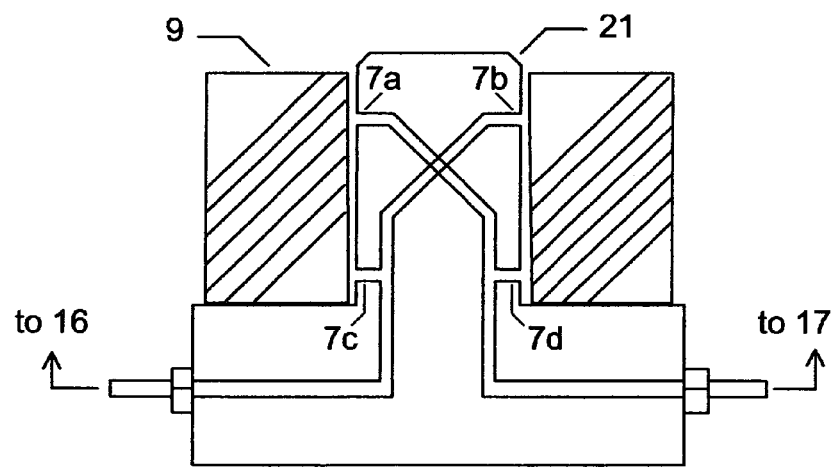
FIG. 4 Is a representation of a dual air circuit fixture to check double squareness.

The present invention comprises the following components:

1—The pneumatic circuit module is a single block of material, such as metal or plastic thru which compressed air passes from its inlet 16 to its outlet 17.
2—Is the first half (reference) of the passageway from 16 to 17.
3—Is the other half (measurement) of the said passageway.
4—Is a piezoelectric transmitter which operates as a miniature speaker in response to the electrical excitation it receives from 11.
5—Is a piezoelectric receiver which operates as a miniature microphone to pick up the sound wave generated by 4 in the (reference) passageway.
6—Is identical to 5 and performs the same function in the (measurement) passageway.
7,7'—Represent the nozzle(s) of the external tooling used to perform the gauging.
8—Is the compressed air inlet to the gauging system.
7a,7b,7c,7d—are the nozzles of typical dual air circuit fixtures used to perform differential measurements.
9—Represents the part being gauged.
10—Is a Voltage Controlled Oscillator (VCO).
11—Is an amplifier which drives 4, causing it to generate a sound wave at the frequency of the Voltage Controlled Oscillator.
12—Is a phase comparator which generates a control voltage to the VCO, based on the phase difference between the output of the VCO and the signal received by the (reference) receiver 5.
13—Is identical to 12, however it provides an output proportional to the phase difference between the signal received by the (reference) receiver 5 and (measurement) receiver 6.
14—Is an Analog to Digital Converter which measures the output of 13 and provides that information in any parallel or serial digital format.
15—This analog signal converter receives the output of 13 and converts it into various analog formats to interface with existing equipment designed to operate with gauging probes of the Linear Variable Differential Transformer and Variable Reluctance Transducer types or DC voltage or current inputs.
16—Is the air inlet of the pneumatic circuit in the embodiment shown in FIG. 1 and become an outlet in the embodiment of FIG. 3.
18—Is a pressure regulator which is used to adjust the working pressure.
19—Is a manual or solenoid operated shut-off valve to save compressed air between measurements.
20—Is the air inlet of the pneumatic circuit in the embodiment shown in FIG. 3.
21—Is the representation of a dual air circuit fixture for differential measurements which connects to 16 and 17 in the embodiment of FIG. 3.

What is claimed is:

1. A pneumatic circuit for pneumatic gaging comprising:
   an inlet connected to a source of compressed air;
   an outlet connected to an air probe having a nozzle;
   a passageway between the inlet and outlet being divided into two equal parts;
   a sonic or ultrasonic transmitter located at a junction of the two equal parts which transmits a continuous wave into the two equal parts;
   first and second sonic or ultrasonic receivers located at the inlet and outlet, respectively;
   a phase comparator for phase comparing the signals from the first and second sonic or ultrasonic receivers and for providing an output signal which is proportional to the distance between the nozzle of the air probe and the surface being gaged.

2. The pneumatic circuit of claim 1, wherein: an air velocity within the pneumatic circuit varies linearly with a restriction imposed to the nozzle of the air probe and its distance from the surface being gaged.

3. The pneumatic circuit of claim 1, further comprising:
   a pressure regulator for adjusting a working pressure provided to the pneumatic circuit.

4. The pneumatic circuit of claim 1, further comprising:
   an electrically controlled shut-off valve providing the ability to generate a zero reference in automated systems applications and for conserving compressed air when the circuit is not in use.

5. The pneumatic circuit of claim 1, further comprising:
   a wireless communication link using radio frequency (RF) or an infrared (IR) signals for communicating with processing equipment.

6. The pneumatic circuit of claim 1 where the sonic or ultrasonic transmitter does not operate in a continuous mode.

7. The pneumatic circuit of claim 1, further comprising:

the circuitry to provide Analogue output, Digital output formats, Frequency output, Quadrature output, LVDT/VRT compatible output.

8. A pneumatic circuit for pneumatic gaging comprising:

an inlet connected to a source of compressed air;

first and second outlets connected to first and second air probes with nozzles;

a passageway between the first and second outlets being divided into two equal parts;

a sonic or ultrasonic transmitter located at the junction of the two equal parts which transmits a continuous wave into the two equal parts;

first and second sonic or ultrasonic receivers located at first and second outlets, respectively;

a phase comparator for phase comparing the signals from the first and second sonic or ultrasonic receivers and for providing an output signal which is proportional to a differential distance between the nozzles and surfaces being gaged.

9. The pneumatic circuit of claim 6, wherein the inlet is located at the junction of the two equal parts.

10. The pneumatic circuit of claim 6, further comprising:

a pressure regulator for adjusting the working pressure based on the range and tolerances of the gaging system requirements.

* * * * *